US009721253B2

(12) United States Patent
Gideoni et al.

(10) Patent No.: US 9,721,253 B2
(45) Date of Patent: Aug. 1, 2017

(54) GATING DECISION SYSTEM AND METHODS FOR DETERMINING WHETHER TO ALLOW MATERIAL IMPLICATIONS TO RESULT FROM ONLINE ACTIVITIES

(71) Applicant: Forter Ltd., Tel Aviv (IL)

(72) Inventors: Iftah Gideoni, Kfar-Vitkin (IL); Ofir Reich, Shimshit (IL); Yaniv Arthur Baruch Meller, Tel Aviv (IL)

(73) Assignee: Forter Ltd., Tel Aviv (IL)

( * ) Notice: Subject to any disclaimer, the term of this patent is extended or adjusted under 35 U.S.C. 154(b) by 0 days.

(21) Appl. No.: 14/991,099

(22) Filed: Jan. 8, 2016

(65) Prior Publication Data
US 2016/0328715 A1 Nov. 10, 2016

Related U.S. Application Data

(60) Provisional application No. 62/157,487, filed on May 6, 2015.

(51) Int. Cl.
*G06Q 20/40* (2012.01)
*G06Q 30/06* (2012.01)
*H04L 29/08* (2006.01)
*G06Q 20/12* (2012.01)

(52) U.S. Cl.
CPC ......... *G06Q 20/4016* (2013.01); *G06Q 20/12* (2013.01); *G06Q 20/401* (2013.01); *G06Q 30/06* (2013.01); *H04L 67/22* (2013.01)

(58) Field of Classification Search
CPC ............................ G06Q 20/4016; G06Q 20/40
USPC .......................................................... 705/44
See application file for complete search history.

(56) References Cited

U.S. PATENT DOCUMENTS

| 7,430,537 | B2 | 9/2008 | Templeton et al. |
| 7,542,973 | B2 | 6/2009 | Segal et al. |
| 8,510,338 | B2 | 8/2013 | Cushman, II et al. |
| 8,805,737 | B1 | 8/2014 | Chen et al. |
| 8,966,088 | B2 | 2/2015 | Wilf et al. |
| 2006/0106738 | A1 | 5/2006 | Schleicher |

(Continued)

FOREIGN PATENT DOCUMENTS

| WO | 02/05224 A2 | 1/2002 |
| WO | 03/034633 A2 | 4/2003 |

OTHER PUBLICATIONS

International Search Report and Written Opinion for International Application No. PCT/IL2016/050468 dated Jul. 19, 2016 (13 pages).

*Primary Examiner* — Jagdish Patel
(74) *Attorney, Agent, or Firm* — Goodwin Procter LLP

(57) ABSTRACT

Various forms of information are utilized in a system and accompanying method for making inferences regarding the trustworthiness of a person performing an online transaction and deciding whether to allow the transaction to have material implications. More specifically, the information relates to the online browsing activity of a user and the online transaction being performed by the user. Further, information regarding certain probable characteristics of the user is determined based on a possible association between the user and one or more known entities. Based on the foregoing information, model attributes are derived and provided as input to a fraud determination model. Using this model and one or more of the attributes, a probability that the transaction is fraudulent is determined.

28 Claims, 8 Drawing Sheets

(56) References Cited

U.S. PATENT DOCUMENTS

| | | |
|---|---|---|
| 2006/0235758 A1 | 10/2006 | Schleicher |
| 2008/0312998 A1 | 12/2008 | Templeton et al. |
| 2011/0093327 A1* | 4/2011 | Fordyce, III ........... G06Q 20/10 705/14.39 |
| 2013/0024361 A1 | 1/2013 | Choudhuri et al. |
| 2013/0197998 A1* | 8/2013 | Buhrmann ......... G06Q 30/0255 705/14.53 |
| 2014/0006404 A1 | 1/2014 | McGrew et al. |
| 2014/0222690 A1 | 8/2014 | Wilf et al. |
| 2014/0337090 A1* | 11/2014 | Tavares .............. G06Q 30/0201 705/7.29 |
| 2016/0042353 A1* | 2/2016 | Canis ................. G06Q 20/4016 705/44 |

* cited by examiner

GATING DECISION SYSTEM AND METHODS FOR DETERMINING WHETHER TO ALLOW MATERIAL IMPLICATIONS TO RESULT FROM ONLINE ACTIVITIES

CROSS-REFERENCE TO RELATED APPLICATION

This application claims priority to and the benefit of U.S. Provisional Patent Application No. 62/157,487, filed on May 6, 2015, and entitled "A Gating Decision System for Determining Whether to Allow Material Implications to Result from Online Activities," the entirety of which is incorporated by reference herein.

TECHNICAL FIELD

The present disclosure relates generally to online systems, more particularly to online decision services, and more particularly to systems and methods for automated decisions regarding the trustworthiness of persons and activities.

BACKGROUND

Conventional systems that attempt to assess the trustworthiness of an online activity suffer from various deficiencies when there is insufficient information explicitly available to make such determinations of trustworthiness. These conventional systems, such as scoring systems, fail to fully consider various sources of available information and lack the ability to make accurate inferences from the information, instead requiring frequent manual intervention which introduces inefficiencies and hinders scale. Further, conventional systems fail to recognize the extensive variations in legitimate human behavior and, instead, may identify legitimate, trustworthy people and activities as untrustworthy. As a result, such systems block trustworthy people from legitimate activities. Moreover, conventional systems do not enable timely inclusion of a domain expert's understanding of up-to-date fraud or identity false-pretense techniques, and either fail to identify illegitimate activities or broadly dismiss legitimate ones.

BRIEF SUMMARY

Described herein are systems and methods for making inferences regarding the legitimacy of transactions, such as online activities, representations, events and the like, and for optionally deciding whether to allow such transactions to have material implications. Various applications of the disclosed techniques are contemplated such as, for example, making an automatic determination as to whether to allow an online purchase transaction to proceed when there is no certainty regarding the legitimacy of the use of the payment method. Data from a variety of sources is analyzed to extract and enrich relevant information, to infer about the plausibility of a transaction to be legitimate, and to decide, given the calculated probability of the transaction being legitimate and certain business considerations, whether to approve the transaction and allow it to have a material effect.

In one aspect, various sources of information are utilized in a method of making inferences regarding the trustworthiness of a person performing an online transaction. In particular, information is received regarding the online browsing activity of a user and the online transaction being performed by the user. Further, information regarding certain probable characteristics of the user is determined based on a possible association between the user and one or more known entities. Based on the foregoing information, model attributes are derived and provided as input to a fraud determination model. Using this model and one or more of the attributes, a probability that the transaction is fraudulent is determined.

The online browsing activity of the user can include browsing activity on a website where the transaction is being performed and possible browsing activity other websites. The activity can be, for example, a path of webpages traversed by the user, particular content viewed by the user, and/or recognized content viewed by the user on a website. The information relating to the online browsing activity can include a measure of time spent by the user viewing a first website where the transaction is being performed, a measure of time spent by the user viewing one or more other websites while connected to the first website, identified breaks in the browsing activity on the first website, a measure of time spent by the user on particular webpages having recognized content, and/or the order of webpages visited by the user on the first website.

The information relating to the online transaction can include buyer contact information, buyer billing information, buyer shipping information, payment information, a purchase time, items in an online shopping cart, and a relationship between a first location and a second location (e.g., billing address, a shipping address, browsing location). In one implementation, the relationship between the first location and the second location is a measure in strength of a link between the first location and the second location based on geographical distance between the first and second locations, a socio-economic similarity or disparity between the first and second locations, a cultural similarity or disparity between the first and second locations, and/or a commercial relationship between the first and second locations.

In one implementation, the information regarding probable user characteristics is determined by determining the probability that the user performing the transaction is related to a known entity, and inferring one or more characteristics of the user based on the transaction and characteristics of the known entity and/or online activities performed by the known entity. The probability of relation can be determined by defining a set of user profile matches based on transaction and known person characteristics, and then identifying potential known entity matches by calculating a relative probability that is based on the probability that the user is the same as a particular known person given the set of user profile matches and the probability that the user is not the same as a particular known person given the set of user profile matches. The probability of relation can also be based on the information regarding the online browsing activity of a user and/or the online transaction being performed by the user.

In another implementation, the probability of relation is based on a detected change of an Internet Protocol address of the user, a detected change in a device of the user, a detected change in an email address of the user, a determination that an Internet Protocol address of the user is masked, and/or identifiers of a device associated with the transaction and/or a device associated with the known entity. The device identifiers can be determined based on hardware and/or software characteristics of the respective device. Further, the inferred characteristics of the user can include socio-economic status, culture, ethnicity, location or IP pattern, buying pattern, consumer preference, and/or a social media activity characteristic.

In a further implementation, the information regarding probable user characteristics is determined by identifying a first set of characteristics associated with the transaction that are relevant to directly linking the user to a known entity and, in parallel, identifying a second set of characteristics associated with the transaction that are relevant to determining a probable link between the user and a known entity. If the user cannot be directly linked to a known entity based on the first set of characteristics, one or more other known entities having a probable link to the user are determined based on the second set of characteristics.

The model attributes can be derived in a number of manners including, for example, creating an attribute indicating that the known entity has one or more transactions that were previously approved, creating an attribute indicating that the known entity has one or more transactions that were manually tagged as legitimate, creating an attribute indicating that the known entity has one or more transactions that have a particular probability of being legitimate given respective ages of the transactions and an absence of contrary evidence, creating an attribute indicating that the known entity has one or more transactions that were previously declined, creating an attribute indicating that the known entity has one or more transactions that were manually tagged as fraudulent or legitimate with a particular probability, and/or creating an attribute indicating that the known entity has one or more transactions that were previously found to be fraudulent.

The model attributes can also be derived by creating an attribute indicating that the known entity has one or more transactions for which a chargeback was claimed, creating an attribute indicating that the known entity has one or more transactions for which an external indication of probable fraud exists, and/or creating an attribute indicating that the known entity has one or more transactions for which a reduced probability of fraud can be estimated based on a lack of indication of fraud given the current age of that transaction. The reduced probability of fraud can be estimated based on historical records that indicate a delayed arrival of a fraud indication and/or quantify a delay in arrival of a fraud indication.

Further still, the model attributes can be derived by creating an attribute indicating a number of different email addresses used by the known entity within a particular time period or periods, creating an attribute indicating a number of different payment methods or different credit cards used by the known entity within a particular time period or periods, creating an attribute indicating a number of transactions by the known entity within a particular time period for which an address verification system returned a particular result, creating an attribute indicating a number of transactions by the known entity within a particular time period or periods for which contact or shipping information for the known entity was different, and/or creating an attribute indicating a number of transactions by the known entity within a particular time period for which a value of the transaction by the known entity is unexpected compared to a distribution of historical transaction values by the known entity.

In one implementation, data associated with historical transactions is provided as input to the fraud determination model, with the historical transactions each being tagged with a probability that the historical transaction was fraudulent or legitimate. The probability that the transaction is fraudulent can then be determined based on the probability that one or more of the historical transactions was fraudulent or legitimate.

In another implementation, in providing the model attributes as input to the fraud determination model, a predetermined coefficient is applied to a particular model attribute, where the predetermined coefficient is automatically calculated on a periodic basis and is based on historical data indicating an effect of the particular model attribute on the probability that a particular transaction is fraudulent. Alternatively or in addition, a dynamic coefficient can be applied to the value of a particular model attribute, where the dynamic coefficient is based on a domain expert's determination of the effect of the particular model attribute on a probability that, given values of other model attributes, a particular transaction is fraudulent.

In some implementations, each model attribute has an attribute value, and the probability that the transaction is fraudulent is determined by (a) calculating, for each of a plurality of different transaction user profiles, the probability of the values of the model attributes collectively occurring given the transaction user profile, (b) calculating, for different transaction user profiles, the probability that the user corresponds with each transaction user profile, and (c) determining the probability that a particular transaction would be legitimate based on a normalization and combination of the probabilities from (a) and (b). The transaction user profiles can include fraudulent user profiles and legitimate user profiles.

In one implementation, the transaction at issue is approved, denied, or pended based on the likelihood that the transaction is fraudulent. This decision can be made by determining a decision threshold based on business considerations and statistics associated with historical transactions, and approving the transaction if the likelihood that the transaction is fraudulent exceeds the decision threshold. The business considerations can include, for example, the sensitivity of a merchant to a decline rate, the sensitivity of a merchant to a chargeback rate, and/or the sensitivity of a service vendor or a merchant to a temporary exposure to a chargeback given a particular payment method. The decision can also be modified by additional business considerations such as an inclusion or exclusion list, the expected reaction of a fraudster community to decline or approval patterns, exposure based on a number of entities having a high accumulated fraud probability, and exposure based on a monetary sum of entities having a high accumulated fraud probability.

In another implementation, an anomaly is identified in a measured parameter (or combination of measured parameters) being tracked over a particular period or periods of time. The probability that the transaction at issue is fraudulent can then be increased based on determining that one or more characteristics associated with the transaction are consistent with the anomaly.

In yet another implementation, an anomaly is identified in a measured parameter (or combination of measured parameters) associated with a first person and tracked over a particular period or periods of time, and also identified in a measured parameter (or combination of measured parameters) associated with a second person and tracked over a particular period or periods of time. The probability that the two persons having characteristics consistent with the anomaly are the same is then increased.

Other aspects of the invention include corresponding systems and non-transitory computer-readable media. The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
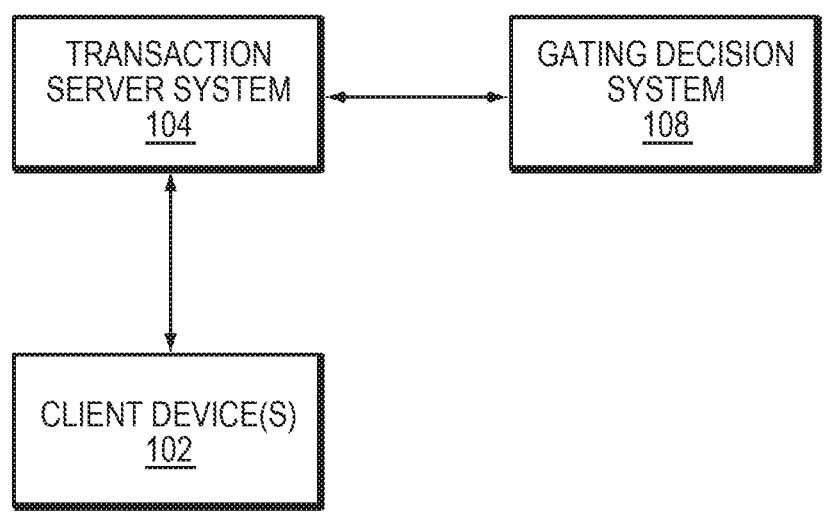
FIG. 1 depicts an example high-level system architecture.

Described herein are systems and accompanying methods for inferring about the trustworthiness of a person performing a transaction and for deciding whether to allow the transaction to have material implications, possibly given uncertain and incomplete information. As used herein, the term "transaction" includes online activities, events, monetary transactions, and other online actions and representations that can permit a material effect to take place. The present system can be used in the analysis of online transactions for the purpose of fraud detection and prevention, as well as transaction approval and confirmation. For example, the system can be used to detect identity false pretense or other illegitimate usage of payment or identity cues by users of online systems, and enable or execute the decision regarding further actions (the allowance or blocking of actions) given these detections. As such, the present system enables safer use of online systems in cases where a risk exists, whether relating to identity protection (such as in the case of enablement of identity proofing); physical safety (such as may materialize in the case of identity false pretense in online managed carpooling, accommodation sharing, or other cases of physical exposure following online activity); financial security (such as may materialize in the case of identity false pretense in online monetary transactions, potentially leading to usage of others' financial instruments, account takeovers, money laundering or other cases of monetary exposure following online activity); or emotional security (such as may materialize in case of identity false pretense in online dating services).

In one particular implementation, the system decides, in substantially real-time (e.g., generally less than 1500 milliseconds), if needed, whether to approve an online transaction, based on various combinations of (a) information regarding online activities of the person performing the purchase, (b) information regarding the purchase act, (c) information collected from the communication to and from the online activities of the purchaser, and (d) the available history of activities, transactions and communications, both of the persons involved in the transactions and of others who may or may not share usage and/or demographic commonalities. Other implementations applying the present techniques are contemplated. For example, given a user's online activities, historical transactions, and/or other information described herein, a probability can be determined that the user is who they claim to be. Taking this probability into account, the user's activities can be facilitated (e.g., allowing one-click checkout on an e-commerce site) or made subject to additional verification requirements (e.g., requiring the user to enter additional identity verification information), in some cases varying on a transaction-by-transaction basis.

The advantages of the present invention include, without limitation, better usage of various data sources in order to better present the probability of an activity to be non-legitimate; an ability to timely include up-to-date knowledge of domain experts; better ability to cater for the multitude of human legitimate behavior and so to allow more legitimate behaviors to use online systems and have material consequences; and better ability to dynamically and automatically take into account business considerations into the decision. The system described herein can also perform decisions simultaneously for a multitude of merchants, and take ownership of the required decisions by these merchants regarding hundreds of millions of consumer transactions. Thus, it is designed for internet-scale, reliability, availability, maintainability and upgradability.

1. System Overview

FIG. 1 depicts a high-level network architecture in which the present system operates. In general, a user associated with a client device 102 communicates with and performs online transactions via transaction server system 104. The user device 102 can be a smartphone, tablet, laptop, desktop computer, palmtop, personal digital assistant, television, gaming device, music player, information appliance, workstation, smart or dumb terminal, network computer, wireless device, minicomputer, mainframe computer, or other computing device, that is operated as a general purpose computer or a special purpose hardware device that can execute the functionality described herein. In one example, the transaction server system 104 hosts an e-commerce website where a consumer can purchase products using his or her smartphone.

The transaction server system 104 communicates with a gating decision system 108 that makes inferences regarding the trustworthiness of the user that is performing a transaction and, in some instances, provides a decision on whether to allow the transaction to have material implications. The gating decision system 108 can make such inferences and decisions using information received from the transaction server system 104 (e.g., information regarding the transaction), information stored in data storage accessible to the transaction server system 104 and gating decision system 108 (e.g., historical records regarding previous transactions), and information received from other sources (e.g., user's online browsing activities). In some implementations, gating decision system 108 can also communicate directly with client device 102 and receive information that can be used in inferring trustworthiness. Continuing with the e-commerce website example above, the gating decision system 108 can use various sources of information, including currently received and stored historical information and enrichment data, to infer the trustworthiness of the consumer and provide a decision to the transaction server system 104 as whether to allow the consumer to complete the purchase of a product.

The techniques described herein can be implemented in any appropriate hardware or software. If implemented as software, the processes can execute on a system capable of running one or more commercial operating systems such as the Microsoft Windows® operating systems, the Apple OS X® operating systems, the Apple iOS® platform, the Google Android® platform, the Linux® operating system and other variants of UNIX® operating systems, and the like. The software can be implemented on a general purpose computing device in the form of a computer including a processing unit, a system memory, and a system bus that couples various system components including the system memory to the processing unit.

The described system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

The client device 102, transaction server system 104, gateway decision system 108, and/or other devices and servers can communicate with each other through a communications network. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network can carry TCP/IP protocol communications and HTTP/HTTPS requests made by a web browser, and the connection between clients and servers can be communicated over such TCP/IP networks. The type of network is not a limitation, however, and any suitable network can be used.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

In one more specific implementation, the gating decision system 108 is partitioned into multiple components: (1) Gates, which are responsible for communicating with external systems and devices, such as transaction server system 104, through a network, and for ensuring that decisions on transactions are made available to requesting systems in the required time; (2) Brains, which are responsible for manipulating arriving data in transaction time or in other times (such as visit time or offline) to transform the data into information relevant to the inference and decision-making, and for performing inference and decision-making regarding transactions; (3) Queues, in which arriving transactions are inserted by Gates while awaiting processing by Brains; (4) various data stores, volatile and persistent, supporting the storage and transfer of data between components of the system; and (5) other supporting systems.

Figure 2:
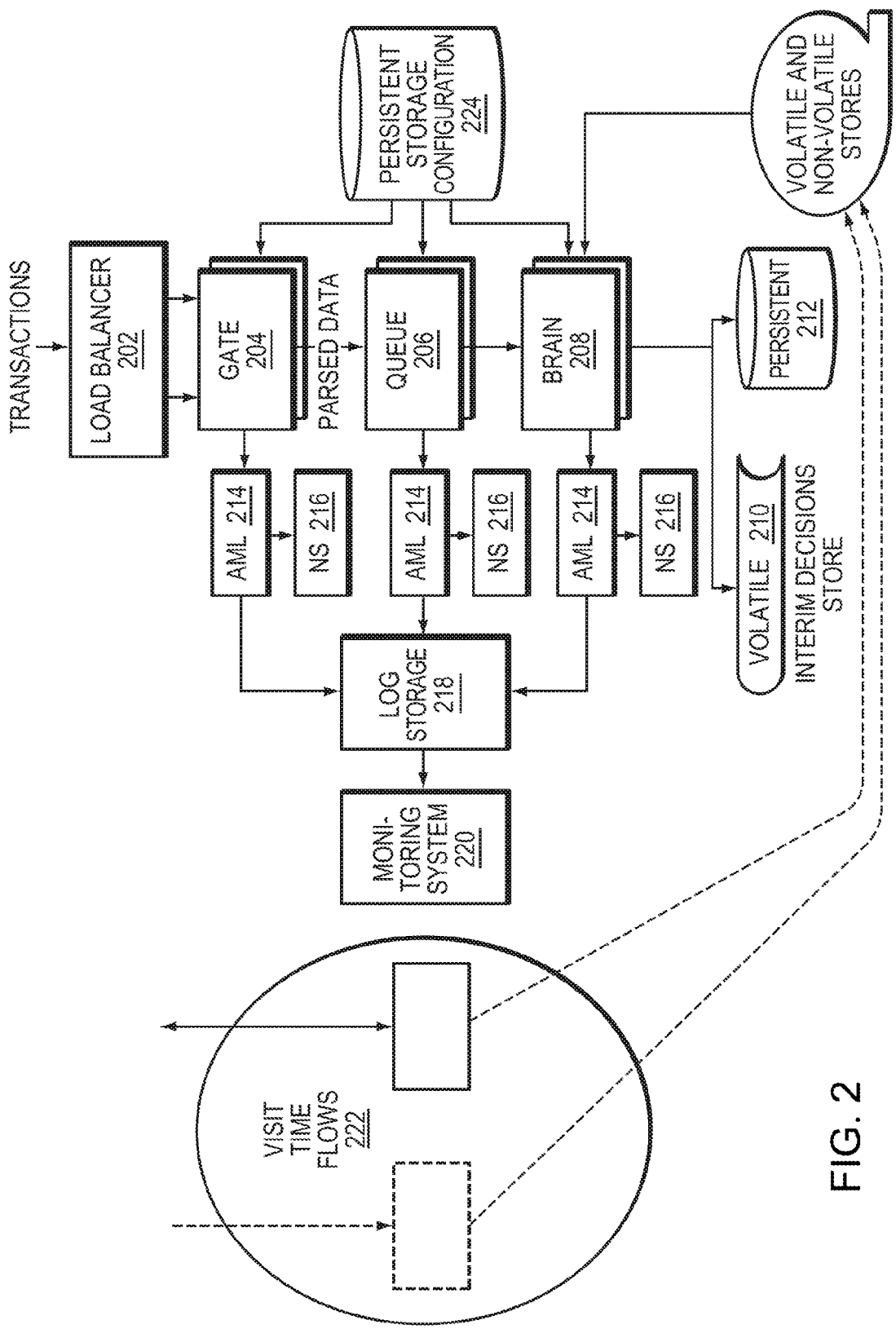
FIG. 2 depicts example high-level Transaction and Visit Time flows.

With reference to this implementation, FIG. 2 depicts an example general flow of a transaction requiring a decision through the system, including "Visit Time" flow of data arriving from online activities of a user. A transaction arrives into a load balancer 202 which allocates it to one of several Gates 204. The Gate 204 parses the transaction data and delivers the data to one of several Queues 206. Each one of several Brains 208, when available, pulls the transaction data from a Queue 206 and processes it to form a decision, then stores the decision in both volatile store 210 and persistent store 212. It should be appreciated that the depicted implementation is one example structural configuration of the system; however, other variations that would provide similar functionality are contemplated.

Each of the aforementioned components outputs interim results of its processing into an Alerting and Monitoring Logics (AML) module 214. The AML 214 may, based on the results, generate alerts to operational and/or analytical staff through Notification System (NS) 216, and further processes and outputs the arriving data to Log Storage 218. Monitoring System 220 pulls and processes data from Log Storage 218 for display to engineering and analytical staff, and to further detect relevant information that may influence decisions regarding current, future and past transactions.

Data arriving from online activities of a user that do not involve a transaction that requires a decision is processed in Visit Time flows 222 and is made available for usage by a Brain 208 in future transactions. A configuration store 224 holds data relevant to the operation of the system and to the inference and decision processes. Configuration data can be loaded in initialization or run time and serves the described system components.

Figure 3:
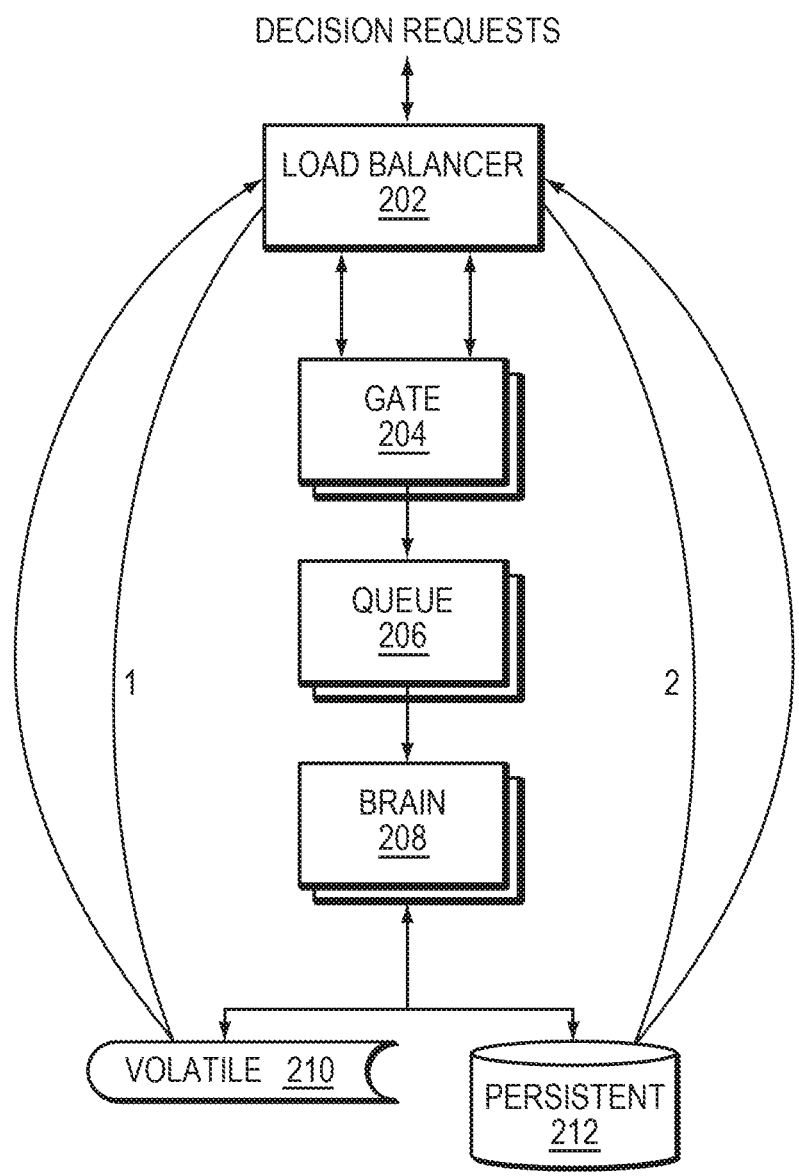
FIG. 3 depicts an example decision flow.

FIG. 3 depicts one implementation of a flow for retrieving a decision related to a transaction. A Gate 204 polls data stores 210 and 212 for a decision made by Brain 208 and, upon identifying that a decision exists, returns it to the requesting system. In one instance, if a preconfigured timeout elapses before a decision can be made, Gate 204 makes the decision itself based on, for example, a preconfigured response or default logic. The polling of the data stores 210 and 212 can be done in a redundant manner. For example, the volatile store 210 can be polled first, then, if the decision is not found, the persistent store 212.

The decision retrieval flow can be either synchronous or asynchronous. For a synchronous flow, no decision request is expected from a requesting system, and Gate 204 starts to poll the data stores 210 and 212 for decisions a preconfigured duration after the arrival of the transaction. For an asynchronous flow, a separate decision request (as shown in FIG. 3) initiates the polling for decision.

1.1 Inference Process

The inference process includes a hierarchical preparation of Attributes, which represent values that can be calculated based on transaction, online activity, historical, and/or external data. Attributes can provide information relevant to determining a probability of interest to a merchant or service provider, for example, the probability that a particular transaction is fraudulent. Attributes can also include information relevant to the construction of one or more other attributes, or the influence of other attributes on the probability of fraud. Attributes include higher-level Attributes, referred to herein as Model Attributes, which are derived from other Attributes and consumed directly by a Model. Various examples of Attributes and Model Attributes are disclosed herein. The inference process further includes processing the Model Attributes by the Model to infer a particular probability of interest. In one example, the probability of interest is the probability that a transaction is legitimate or, alternatively, fraudulent. The Model can use a pre-calculated (and potentially a machine-learned) configuration in determining the probability of interest.

Figure 4:
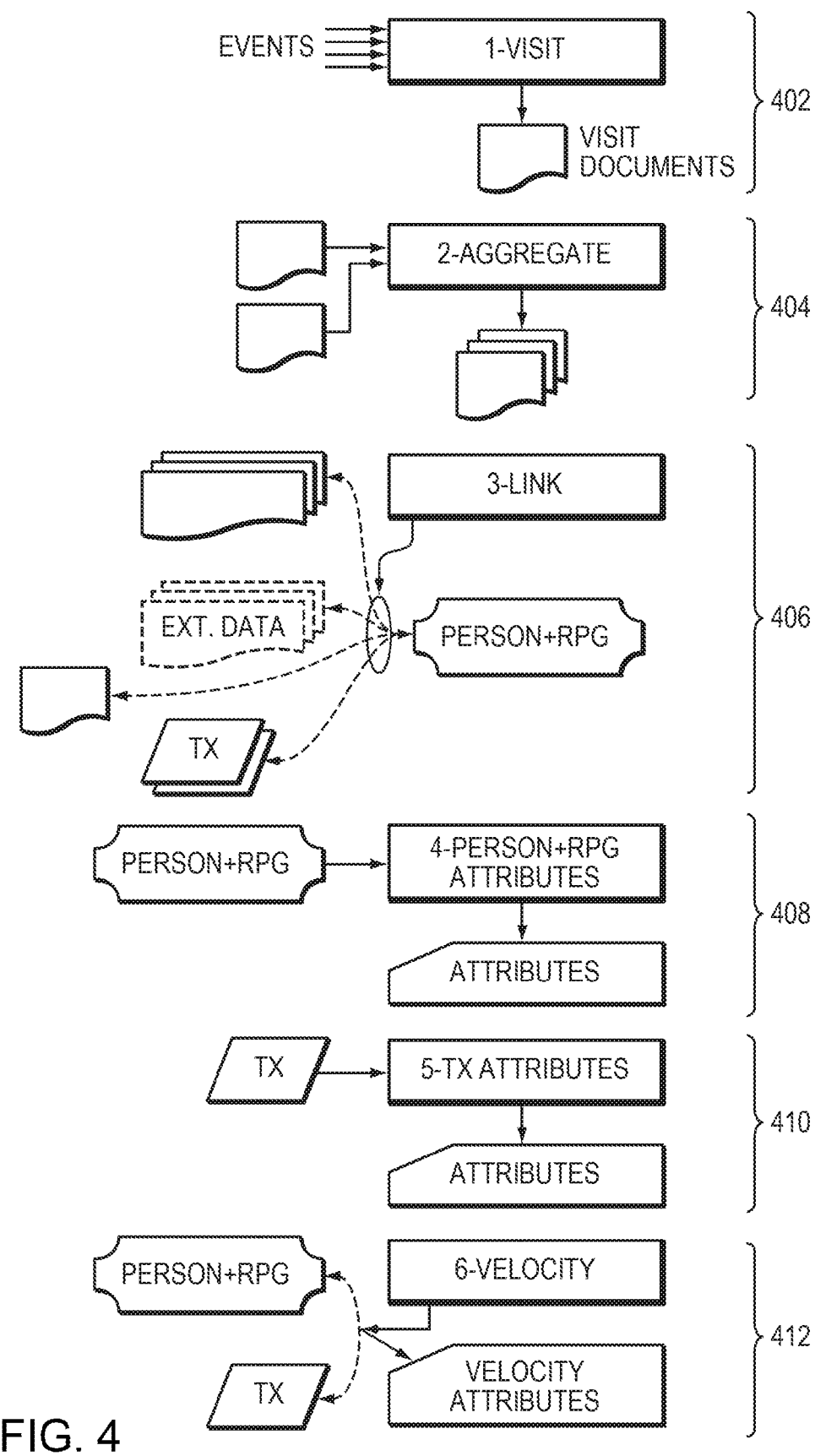
FIG. 4 depicts an example hierarchical process for Attribute formation.

The various stages of the hierarchical preparation of Attributes for inference are depicted in FIG. 4. Stage 402 shows the preparation of Visit Time (VT) enrichment Attributes, which are the result of aggregation and enrichment of events arriving from online activities for a non-continuous operation (in the case of browsing websites, for example, a single page visit), and are the building blocks of behavioral, cyber, and fingerprinting analysis. Examples include, but are not limited to, proxy detection and classification, IP enrichment, mouse movement segmentation, and page and page-referral classification. Stage 404 depicts Transaction Time (TX), VT, and/or offline temporal aggregation and data reduction. This can include, for example, aggregating webpages into the form of a browsing session.

Stage 406 includes matching and maintaining probabilistic links among entities, and can be performed offline or in VT, or during the occurrence of a transaction. Such links can include, for example, pages, browsing sessions (including external data), and transactions linked to entities. In stage 408, based on the matches made in stage 406, additional insights are derived, such as socio-economical segmentation, travel habits, purchases and web usage history, and routine locations. These insights can serve as Model Attributes or as history references in the Velocity process, described further below. They can also influence both the probability of fraud and the probability of particular segmentation of an entity signifying fraudulent or legitimate activity.

As used herein, an "entity" can include an individual, group, organization, or a form of identifier representing a performer of a transaction, currently or historically. One type of entity, a PersonEntity, can be a Person or a RelatedPersonsGroup (RPG). A Person is a single person (even if having multiple associated identifiers) and can be, for example, a card holder, a shipping recipient, an online purchaser, and so on. An RPG is a positively related group of one or more Persons, e.g., a firm, a family, an organization, and the like. In one implementation, a relation between two Persons is "positive" if the participation in a transaction by both Persons is unlikely to lead to fraud (e.g., Person A performs a purchase transaction using Person B's billing information). A Person can belong to more than one RPG.

Stage 410 builds TX Attributes on data arriving in the incoming transaction, and stage 412 builds Velocity Attributes based on matches between the incoming transaction and historical PersonEntities. The Velocity process, described in further detail below, includes detection, where transactions are assigned to a PersonEntity, and Attribute calculation, which is enabled by the assignment. Examples of such Attributes include, but are not limited to, a similarity to a past known legitimate or fraudulent PersonEntity, the total count of payment methods used by the entity in last several days, and a match of transaction data to a plausible Story for the entity (described further below).

Using the Model Attributes derived in hierarchical preparation of Attributes, together with associated coefficients and Stories space, the Model outputs the desired probability (e.g., the probability that a particular transaction is fraudulent).

1.1 Decision Process

The Decision Process receives the probability output from the Model and uses the output to determine whether the transaction is permitted to have a material effect. In addition to the Model output, the Decision Process can also consider historical decision data (e.g., fraud and decline rates), temporal behavior of various statistics (Blind Velocity, described below), business constraints and policies (either of the vendor or the client), and target functions in making a decision. The process can further optimize the decision to maximize a business target function under specified business constraints.

1.3 General Transaction Flow

Figure 5:
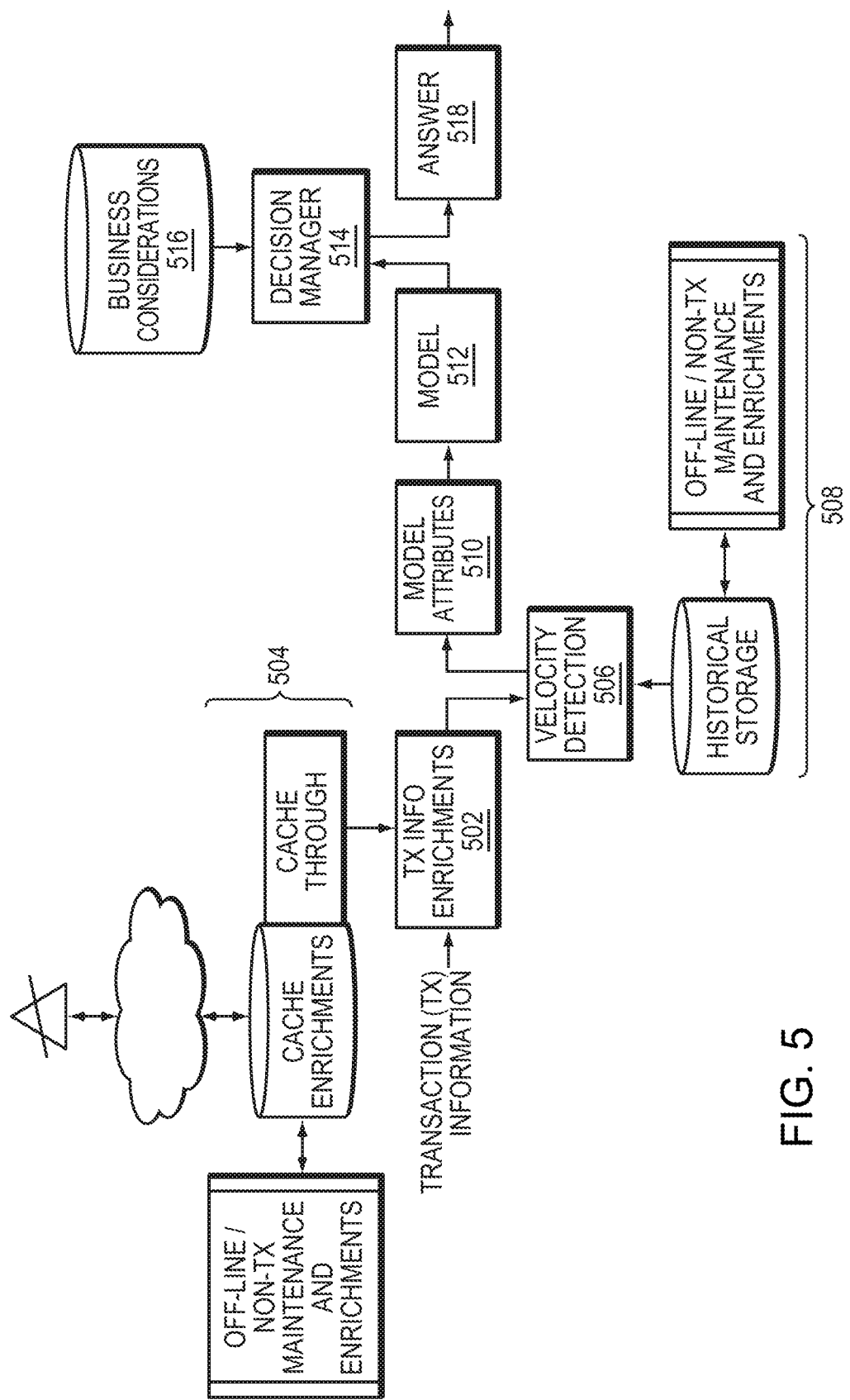
FIG. 5 depicts an example Transaction flow.

FIG. 5 depicts one implementation of a general Transaction flow that can occur within a Brain. Transaction data arriving from the Queue 206 is supplemented using Transaction Information Enrichments 502, obtained from Enrichment Storage 504. This enriched data, along with data output from Velocity Detection 506 (described further below with respect to FIG. 7), including linked information from stored PersonEntities in Historical Storage 508, are transformed in hierarchical steps into Model Attributes 510 (as described above) which are input into Model 512. The resulting probability of fraud P(CB) is input into Decision Manager 514, along with Business Considerations 516, to generate a decision 518 (e.g., approve, decline, wait), along with possible secondary decisions regarding additional steps (for example, sending the transaction for manual review).

Model Attributes can have pre-calculated Model coefficients. In particular, if there is sufficient historical data to determine their influence on the probability of fraud and on the dependency of other Model Attributes on their values, these coefficients can be machine-learned. Alternatively, Model Attributes can have non-machine pre-calculated or pre-asserted coefficients that are inserted based on the best judgment of domain experts. Such domain experts' insights can be inserted into the Model 502 by (1) formulating logics associated with Attributes, thereby describing particular world states in which particular items of information have different likelihoods of being observed depending on whether a user is acting legitimately or fraudulently, (2) manually inserting Model coefficients, including the level of cross-influence of Attributes on each other, and (3) utilizing dynamically calculated Attributes, which define particular world states for which particular odds ratios (described further below) are assigned.

The flexibility of the system, needed in order to respond well to the temporally varying fraud and merchant landscape, arises from (1) the ability to quickly insert logics into Model Attributes, (2) the ability to quickly set the influence of Model Attributes on the model, and (3) controlling the configuration of the Decision Manager 504 to quickly adapt it to changes in (i) the rate occurrence of particular types of system decisions (such as rates of declines of legitimate transactions or approval of fraudulent transactions), (ii) changes in merchant sensitivities, or (iii) changes in business targets.

Figure 6:
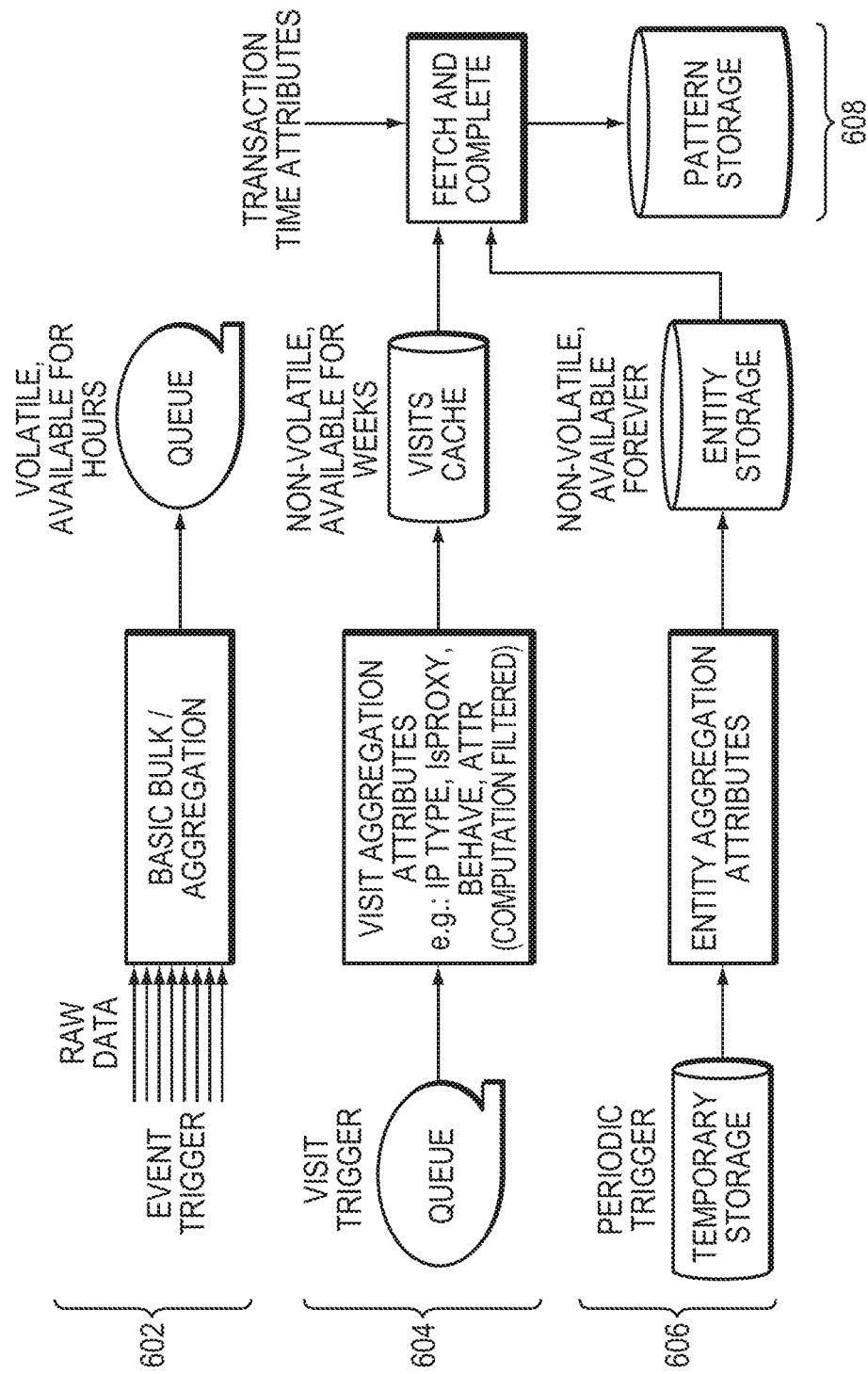
FIG. 6 depicts an example Visit Time flow.

FIG. 6 depicts one implementation of a Brain Online Activity flow (Visit Time flow). In stage 602, arriving external events (e.g., from a client browser) are written to a temporary storage or queue, such as a volatile memory queue server. In stage 604, from the temporary storage or queue, the events are aggregated and enriched into a condensed form which contains the relevant information from the event for particular point in time. Such condensed data can include a description of a single page visit in a website (which may be characterized by its uniform resource locator (URL), its type, the referral domain and type, and other data about the visit that may be extracted or inferred from the arriving events, such as information contained in the Hypertext Transfer Protocol (HTTP) headers of the communication), and the Internet Protocol (IP) address and its enrichments (e.g., extraction of domain details from internet services such as whois, extraction of reverseDNS, and extraction of geographic location from the IP address). The aggregation and condensation in stage 604 represents, in general, the information gathered from the events for a particular point in time, but also aggregations of information from temporal chaining of events that happened on the same page or during a limited amount of time, which may be pre-defined. Examples of the foregoing include mouse movement patterns and scrolls, and touch patterns, where applicable (e.g., on mobile devices). The temporal analysis of the aggregated condensed information is carried out in stage 606, in which the point-in-time information is chained to identify temporal patterns of behavior. The results of such analyzed patterns are stored, representing, for example, information about browsing sessions and user behavior on a website.

The aggregated and enriched data can be maintained in various forms of storage depending on retrieval requirements relating to, for example, speed and duration of storage. For example, aggregated data in stage 602 can be stored in volatile, short-term (e.g., availability limited to several hours) storage (e.g., Redis data structure server). Aggregated Visit data processed in stage 604 can be stored in a non-volatile cache with mid-term (e.g., availability limited to several weeks) storage, and aggregated entity data processed in stage 606 can be stored indefinitely in long-term, non-volatile storage. The results of stages 604 and 606 are thus available for the Transaction (TX) flow for use.

2. Prime Inference Components
2.1 Behavior and Visit Time Processes

Described in this section is one exemplary implementation of a method for the extraction of information about the trustworthiness of a PersonEntity from (a) a user's browsing activities on a merchant's website, and (b) the user's browsing activities on other unrelated websites from which information is able to be received.

As described with respect to FIG. 6, received data is aggregated and enriched into a representation of the information available for particular point in time, from which are derived fraud-relevant Attributes. Fraud-relevant Attributes include pieces of information which can be extracted if available and may be deemed relevant to the probability that the user performing the transaction is engaging in fraudulent activity. Examples of Attributes include:

1) Measurement of time spent by the user actively viewing the merchant's website.
2) Measurement of time spent by the user viewing different websites or applications on the user's device while still connected to the merchant's website.
3) Detection and analysis of pauses and long breaks in the user's visit to the merchant's website.
4) Measurement of time spent by user in individual webpages or completing sections of a purchasing experience.
5) Insights extracted from the first webpage in the merchant's site visited by the customer (e.g., reverse engineering of referrals and previous browsing from the landing page—landing on a particular product from a display advertisement may directly indicate a higher probability of legitimacy, and may indicate previous browsing of this product).
6) Analysis of browsing path in session and between sessions (e.g., calculate fraud probability of user's path of transition through pages in the merchant's site; detect user visits to parts of the merchant's website that are likely of no interest to fraudulent users; analyze duration of, and gaps between, browsing session and their pattern in comparison to legitimate patterns).

In some instances, Attributes are filtered to exclude outliers and programmed behaviors (e.g., only consider webpages viewed within particular time limits).

2.2 Identity Persistency and Entities Representation

The example Attributes below can be derived from pieces of information that are extracted if available, and that may be deemed relevant to the probability that a Person at issue (e.g., a user browsing a website or performing a transaction) is the same as a Person that performed other online activities, or to the probability that the Person is performing an illegitimate transaction. In one implementation, the system uses certain Attributes to support the linking of incoming events and transactions to PersonEntities (in stages 406 and 412 in FIG. 4). These Attributes include, but are not limited to, mouse movement patterns; similarity in Internet Service Provider; similarity in behavioral, email, and username patterns; and other characteristics suitable for correlating new transactions with known PersonEntities.

The system can also use certain Attributes to make inferences regarding characteristics of the Person at issue (in stages 408 and 412 in FIG. 4). Examples of such Attributes include:

1) Detection of changes of the user's IP address while viewing the merchant's website.
2) Detection of different devices used by the same user through the merchant's account login.
3) Detection of difference in email addresses given by the user at different stages in the transaction (e.g., signup for newsletter vs. checkout, and other instances).
4) Detection of masking of the real IP address by the user through use of proxy servers or dedicated-server hosting while on the merchant's website.

5) Detection of changes in the device used by the user to visit the merchant's website, including, for example, details of the operating system, browser, and/or hardware.
6) Extracted details of the device such as cookie, operating system, browser, screen resolution, fonts, plug-ins, which in an aggregated form may form a significant device identity.
7) Detection of switching/deletion of "cookies" made by the user while on the merchant's website.

Particular Attributes, such as those described above, that are related to the device involved in a current transaction can contribute to a probability that the same device was used in other transactions. For example, if a unique identifier that can "fingerprint" a device (e.g., a cookie, a generated identifier based on software and/or hardware characteristics of the device, etc.) is observed in multiple transactions, the probability that the same device was used in those transactions is increased. Similarly, certain Attributes can be used to determine whether multiple devices were likely used by the same Person to perform one or more transactions. Such Attributes can include, for example, an existence of a cookie associated with the same Person on different devices, the detection of different devices using the same IP address, the use of certain external services by different devices, the login state of different devices on the same website or portal, and combinations of the foregoing.

2.3 Personal Entity Attributes

Given data identified by links to known PersonEntities (e.g., historical transactions, pages, browsing sessions, and external data), new insights are constructed (in stages 408 and 412 in FIG. 4) beyond the Attributes that can be extracted from the data carried in each transaction or browsing session. Examples of classes of such Attributes are socio-economic status, culture and ethnicity, location patterns, buying patterns, and Attributes that are derived from the data associated with a Person's account with the merchant, received either as a dedicated sharing of data by the merchant or as specific additional fields in a transaction. Examples of such derived Attributes include (1) an identification of preferences a user has in his account regarding sales and discounts, and whether these are different from default preferences; (2) an identification of preferences the user has in his account regarding brands and sizes, and whether these are different from default preferences; (3) number of payment cards used by the user within a particular time period (e.g., last 14 days); (4) number of countries from which the user initiated a transaction within a particular time period (e.g., last 30 days); (5) reputation of the user as provided by an external source (e.g., receiving an indication of fraud for a past transaction of the user, or lack of such receipt for previous transactions after an amount of time); and (6) where access to social network aggregates is permitted, a score of overall social network activity.

2.4 Transactional Attributes

During the transaction, fraud-relevant Attributes can be extracted from the data arriving with the transaction (stage 410 in FIG. 4). Examples of such Attributes include (1) from the shipping address, a determination of the socio-economical state of that neighborhood; (2) from the billing address, a determination of the socio-economical state of that neighborhood; (3) a "distance" measure based on a determination of the geographical distance of the shipping from billing address, and a distance from these to the location of the IP address from which the transaction was executed (if not a proxy), where the "distance" can be a measure based on a disparity or similarity between a socio-economic, cultural, or other intangible state of a country, state, city, or neighborhood associated with the billing address and a country, state, city, or neighborhood associated with the shipping address; and (4) a level of match between the username on a provided email and the name given in the billing details.

2.5 Velocity

This section describes one implementation of a technique for extracting information from the association between a Person performing a given (e.g., current) online activity and a history corpus of online activities of the same or a different type. For example in a particular case, we may be interested in the trustworthiness of a particular Person who is currently acting online (e.g., whether performing a purchase, receiving goods, being billed for a purchase, etc.) by amending the information about him through the information associated with his past online activities. The current activity can be an online purchase transaction, and the history corpus can include previous online purchase transactions, data collected from webpage browsing and user inputs (regardless of the source from which these data are collected), and background information.

The Velocity technique includes two stages: (1) detection, in which the current activity is linked to past activities by asserting the probability of a PersonEntity associated with the current activity to be the same as a PersonEntity in the history corpus; and (2) information extraction, in which additional information from the linked activities is used to answer particular questions about the PersonEntities involved in the current activity. These two processes can be executed serially or in parallel.

2.5.1 Detection

In the detection phase, PersonEntities in the history corpus are identified that have a high probability of being involved in the current transaction. This identification is accomplished by implementing a full Bayesian inference system to assert, for each known PersonEntity, the odds ratio that the current transaction involves the known PersonEntity; i.e., Probability (same)/Probability(!same)).

Using Attributes from the history corpus of known PersonEntities, and the Attributes of the current transaction, a set of matches is defined. These matches are used to establish the odds ratio, or the probability that PersonEntity data had been previously collected from the same Person currently performing the transaction. The matches can be exact (that is, a match either exists or not) or quantified by a measure (e.g., a function of the distance between two shipping addresses which are not the exact same address, although, in general, the measure need not be a distance measure) given the possible user profiles, or Stories, of the PersonEntity. The Story can characterize the PersonEntity by properties such as whether the PersonEntity is engaging in a fraudulent or legitimate transaction, where the PersonEntity lives, what is its ethnicity, and so on. That is:

$$\frac{P(\text{same} \mid \{\text{matches}\})}{P(!\text{same} \mid \{\text{matches}\})} = \frac{P(\text{same} \mid)}{P(!\text{same} \mid)} \cdot \frac{P(\{\text{matches}\} \mid \text{same})}{P(\{\text{matches}\} \mid !\text{same})}$$

where:

$$P(\{\text{matches}\} \mid \text{same}) = \sum_{s \in S} P(\{\text{matches}\} \mid \text{same} \cap s) \cdot P(s \mid \text{same})$$

(and, similarly, for P({matches}|!same))

where S is the space of possible Stories and s is one of the Stories, and where:

$$P(\{matches\}|same \cap s) = P(match_1|same \cap s) \cdot P(match_2|same \cap s \cap match_1) \cdot \ldots \cdot P(match_n|same \cap s \cap match_1 \cap \ldots \cap match_{(n-1)})$$

where n is the number of available matches.

In one implementation, as an approximation, past transactions are taken as representing the past entities. In such a case, the current transaction is matched to historical transactions. In another implementation, as an approximation, the distribution of possible Stories is neglected, and the Stories are approximated by the most likely story of the PersonEntities involved. As another approximation, the dependence of the match probability on the Story of the entity can be entirely neglected.

In one implementation, as an approximation, the coupling between matches can be neglected, leading to naïve Bayes modeling:

$$P(match_k|same \cap s \cap match_1 \cap \ldots \cap match_{(k-1)}) \approx P(match_k|same \cap s)$$

This enables the representation of the problem as a collection of measures on sub-collections of the matches. However, the dimensions (matches) are not necessarily orthogonal and, in general, are coupled, and may be nested. Moreover, the measure has a different normalization, is not necessarily symmetric across dimensions, and is not necessarily a distance measure. In particular, the distance does not necessarily satisfy the Euclidean norm (in $L_2$ distance). In particular, when attempting to identify a match under the assumption that the transaction is fraudulent, it is assumed that the person performing the fraudulent activity will attempt to conceal his or her identity and so proximity will not be found (at all) in many of the dimensions.

As an approximation, all or some of the coupling between the dimensions can be neglected. As a further approximation, nested dimensions can be treated as fractions, splitting the elements into several non-dependent (or less dependent) sections, and calculating the "strength" (or score) of each fraction separately. The scores of the sections are then combined together. For example: match state (weaker), and match town separately (stronger).

As another approximation, nested dimensions can be treated as a set of reduced, or even a single, compound, dimension; i.e., dimensions which are the finer levels of the nested dimensions. For example, where a town match may be informative, only the street address (given country-state-town/zip code full match) may be taken into account.

Ultimately, a match to a known PersonEntity need not reach low distance in any particular match/dimension, and a higher match does not necessarily indicate a higher probability of the same entity (for instance, with Account-Take-Over (ATO) fraud, a high match conceals a different entity).

Attributes for matching in the detection phase include, but are not limited to: (1) elements provided by a user performing a transaction, such as the user's contact information (e.g., name, email, phone), the user's billing information (e.g., credit card, PayPal account, name on card, billing address), and the user's shipping information (e.g., shipping address, name of recipient); (2) elements provided by a merchant, such as purchase time, items in a shopping cart, and shipping method; (3) elements provided by the user's device, such as IP address and HTTP headers; (4) behavioral elements, such as mouse movements; (5) visit elements, such as pages visited, references to the merchant's webpages, and time spent by the user on each webpage; and (6) multiple entities (i.e., in cases where there is more than one Person involved in a purchase (e.g., marketplaces), a match can be based on some or all of the entities involved). Attributes can further include one or more parts of, or patterns or partial patterns based on one or more of, the foregoing.

The ability to test the matches of a transaction to a large quantity of PersonEntities according to the above formulae, in real-time and for many concurrent arriving transactions, is expensive in time and money as it requires large number of computers to store, access, and process all possible matches. Hence, beyond the above possible approximations, disclosed herein is a technique intended to reduce latency, concurrency of complex operations, depth of history corpus and the length of single match-candidate documents.

Figure 7:
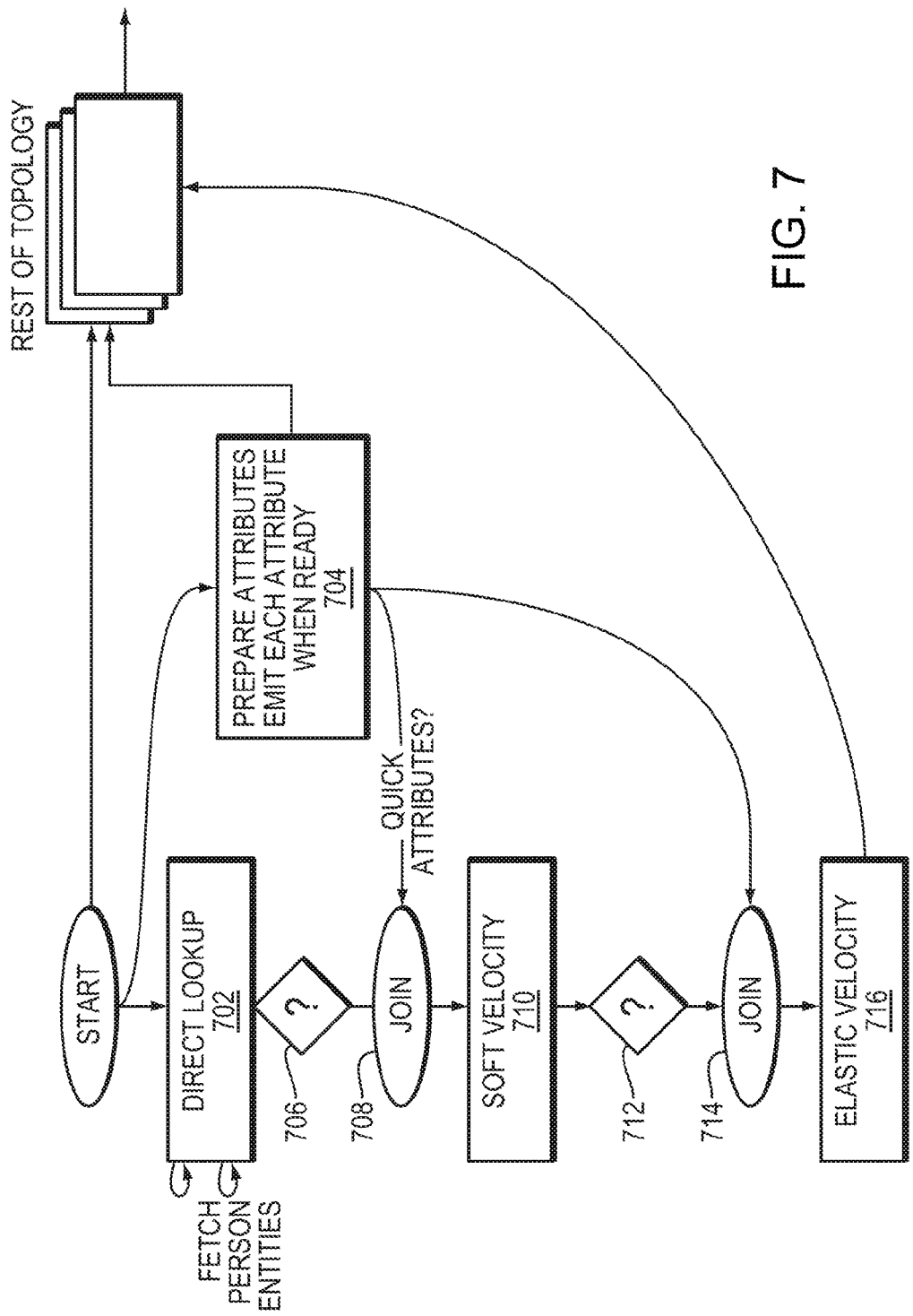
FIG. 7 depicts an example Velocity flow.

FIG. 7 depicts one implementation of a Velocity flow for matching incoming transactions with known PersonEntities. In stage 702, an arriving transaction is first examined to identify prime indices which may directly link the transaction to past known PersonEntities. Such prime indices can include cookies, IP addresses, and other unique or potentially unique identifiers. If one or more prime indices are identified, potentially matching PersonEntities are fetched in one or more roundtrips to a data store, in order to provide local memory the related parts of the matching PersonEntities (e.g., transactions, browsing sessions, visited IP addresses and their enrichment, etc.). In parallel, in stage 704, the incoming transaction is processed to extract information from its data that is relevant for further stages of the Velocity flow and for other Attributes. For example, physical and IP addresses can be processed to extract geographical location coordinates (latitude/longitude) which may be relevant to distance Attributes and for location matching in later stages.

At stage 706 a decision is made whether to further explore for PersonEntities potentially involved in the incoming transaction (e.g., if inadequate prime indices are identified or otherwise not useful). This decision step reduces the concurrency of transactions reaching further stages, which are more computationally complex. If the Velocity flow continues, Attributes prepared in stage 704 can be combined with those thus far determined in the flow.

In stage 710, Soft Velocity, fast nearest neighbors or other data matching algorithms can be used to determine one or more known PersonEntities that match with high probabilities and which had not previously been identified using prime indices in previous stages. Incorrect matches may be found (i.e., false negatives), and there may also be low probability matches (i.e., false positives).

At stage 714 a decision is made, taking into account whether and which PersonEntities were identified in previous stages, as to whether it is necessary to continue attempting to identify relevant PersonEntities. If the Velocity flow continues, further Attributes prepared in stage 704 can be combined with those thus far determined in the flow. The PersonEntities passed to the next stage 716 are the low probability matches identified in stage 710.

In stage 716, Elastic Velocity, the incoming transaction is matched to the low probability PersonEntity matches from stage 710 using more accurate but generally slower algorithms, such as Elasticsearch soft query matching. The resulting matches are scored and a probability that the match is accurate is calculated for each match.

In one implementation, to minimize the response time of the matching process, a "two layer detection" technique can be used. In the first layer, the majority of the data is screened to identify only the relevant data to the transaction and, then, in the second layer, a rigorous and complex analysis is applied to determine the actual relevance of each data point.

2.5.2 Information Extraction

Given a particular association, which has a certain probability to be true, of the current transaction with a past PersonEntity, a number of Attributes are derived. These Attributes can be used (on equal footing with other Attributes in the Model), to influence the probability of the current transaction to be fraudulent.

Examples of such Attributes include those that provide additional evidence through information currently in possession regarding the legitimacy of past transactions, such as:

1) The PersonEntity has transactions that were approved in the past. In general, this is a weak indication as it does not add information by itself (the past transaction decision may be wrong, and in principle no additional information is added here).
2) The PersonEntity has transactions that were manually tagged as legitimate (e.g., by a fraud analyst) in the past. The strength of this Attribute is the quantification of the additional information in this tagging. For example, if the Fraud probability indicates probability_of_fraud=0.5%, and the manual tagging indicates probability_of_fraud=0.1%, then the odds ratio (fraud/legit) component provided by this Attribute is about 1/5.
3) The PersonEntity has transactions which are of a certain age, and for which no indication of fraud (such as a chargeback claim) has yet been received. The strength of this Attribute depends on the probability that if a particular transaction were fraudulent, would the fraud have been identified by this time. For example, if it is known that, given the age of the past transaction, 90% of fraud notifications have already generally been received (e.g., chargeback notifications), then the odds ratio (fraud/legit) component provided by this Attribute is about 1/10.
4) The PersonEntity has transactions that were declined in the past. See item 1 for observations on the strength of this Attribute.
5) The PersonEntity has transactions that were manually tagged as fraud (e.g., by a fraud analyst) in the past. See item 2 for observations on the strength of this Attribute.
6) The PersonEntity has transactions that were found to be fraudulent in the past (e.g., by receiving chargebacks claims for the transactions). The strength of this Attribute is highly determinative of fraud, limited only by the probability of a match between the current transaction and the PersonEntity, times the probability of a match between the past transaction to the PersonEntity.

Other examples of such Attributes include those that provide additional evidence through the accumulation of information regarding the similarity of the transactions (current and past, and other past activities) to the behavior of a person engaging in legitimate activity or to the behavior of a person engaging in fraudulent activity, such as:

1) Number of email addresses used by the PersonEntity for transactions within a particular duration.
2) Number of credit cards used by the PersonEntity for transactions within a particular duration.
3) Number of transactions by the PersonEntity for which Address Verification System (AVS) returned positive/negative within a particular duration.
4) Number of different payment cards (and number of different cards of different issuing countries) used by the same PersonEntity within a particular duration.
5) Number of different related transactions where for the same phone numbers for different names were given.
6) Number of transactions of the same PersonEntity within a particular duration where each of a number of transactions (or their sum) was above a certain amount.

The Attributes, as exemplified above in this subsection, may be parameterized according to the particular merchant with which the transactions occurred, or according to other environmental parameters. For example, the duration in the last listed item above can be set differently for different merchants, e.g., a business customer that buys auto parts may do so legitimately with purchases above $1000 day after day, but the same activity can be indicative of fraud for day after day purchases of watches. Thus, the duration, amount, or whether the Attribute is used at all can change from merchant to merchant and from transaction to transaction.

Likewise, the strength of influence of the Attributes as exemplified above in the Model can be parameterized according to the particular merchant in which the transactions occurred, or according to other environmental parameters. Thus, the Model coefficients, indicating the change in the probability of fraud (or the change in the strength of other Attributes) given a particular Attribute, can change from merchant to merchant, or according to other environmental variables, such as season (e.g., lower intervals between purchases may be more normative just before the holidays).

2.6 Blind Velocity

In one implementation, the present system can implement a technique referred to herein as "Blind Velocity" in evaluating transactions for fraud. Specifically, Blind Velocity includes a process for detecting anomalies in the behavior of aggregating statistics, of individual and collections of data, relevant to fraud. For example, an unexpected increase in purchases from a particular geographical area through a particular type of connection may indicate possible fraudulent activity.

Generally, using this technique, the present system detects an anomaly in one or more measurable parameter(s) or a combination of measurable parameters, and uses the detection for (1) elevating the probability of fraud where the situation is consistent with the anomaly, in a monotonous way with regard to the level of anomaly, and (2) increasing the probability that persons with having a situation consistent with the anomaly are the same person, assuming the source of anomaly is one, and (3) alerting a human.

As an example, it may be desirable to track, alert, and consider, for fraud probability and Velocity matching, the rate of transactions that are originating from a combination of (1) the country from which an IP address or range of addresses originates and (2) the country associated with the billing address. The two countries can be the same country or different countries. To do so, the system collects and maintains long-term (e.g., one month or longer) rate histograms for some or all combinations of countries, filled with rates of transactions (or Persons) that have an IP address originating from country 1 and a billing address in country 2. These are considered training rates, and are maintained in reasonable intervals, e.g., rates are recalculated for every fifth of the training duration (for a month of training data, this would be every 6 days). Further, the system collects and maintains recent (e.g., one day) rate histograms for some or all combinations of countries, filled with rates of transactions (or Persons) that have an IP address originating from country 1 and a billing address in country 2. These are considered test rates and are maintained in intervals determined by the test data span (e.g., one day) and alert latency consideration. For example, in order to detect a strong anomaly early, the system can measure the test rates every hour.

Then, for each combination of countries, the system computes the likelihood of having the test rate measurement given that the underlying rate is the training rate. If the likelihood is lower than a threshold, one or more of the following actions can be taken: (1) an alert to human analyst is triggered; (2) transactions having the anomalous countries-combination receive another Attribute, which contributes to the probability of fraud, taking into account the anomaly, and (3) transactions having the anomalous countries-combination receive another Velocity Correlation Attribute of the countries-combination match, contributing to the probability of a match, taking into account the anomaly. Other applications of the Blind Velocity process are contemplated. In one implementation, the threshold against which the likelihood is measured is determined based on the acceptable false alarm rate. For example, if one false alarm per month is considered acceptable, and there are 1,000,000 tests in a month, then $10^{-6}$ would be the threshold of the probability of getting such an outlier as a result of sampling from the base distribution.

2.7 Stories Model

The Model, as stated above, is the component responsible for determining the probability that a particular activity is not trustworthy (and in the particular example used throughout this description, that an online purchasing transaction is fraudulent), given the information in the Attributes associated with that transaction and with (possibly probabilistically) the Person performing the transaction.

Various well-documented techniques exist for inferring a probability of a given target function from a multitude of Attributes/Features, using either supervised or unsupervised training sets. Nevertheless, these techniques, in general, do not account well for the intra-dependencies of the Attributes. In other words, they do not account well for the personal "story" of the person behind the keyboard, whose activities emit the pieces of data on which Attributes are constructed.

Accordingly, described here is the Dependence Eliminating Bayesian Intermediate Layer (DEBIL). Notably, DEBIL includes the creation of several hidden variables (termed "adjectives") that make observable variables independent (given fraud/legitimate and the values of the adjectives).

A "story" or "profile," with respect to the Model, is an answer to a specific small set of profile questions which characterize a Person. The profile includes values for each associated adjective. A story has a prior probability (which indicates how plausible it is) and, given a specific story, the probability to receive specific values for the Attributes can be calculated. "Adjectives" are parameters or questions of the profile that are not directly observable but affect the distribution of the Attributes, and so can be estimated. Adjectives can include, for example, the ethnicity or country of origin of the Person performing the transaction. Attributes, as described throughout this specification, include observable features of the transaction (e.g., shipping address, operating system, languages, etc.).

The Stories Model is a model for estimating the probability that a given transaction is fraudulent (i.e., not legitimate). The Model is an automatic hybrid between an automatic computation model and deduction by a human analyst. The Model is based on the following observation: if a transaction is legitimate (e.g., a purchase performed by the card holder), there should be a plausible, consistent story behind it which encapsulates who the card holder is (his profile) and why he is performing this specific transaction with these Attributes. The Stories Model attempts to find that story (or profile) and assess its plausibility and its consistency with the Attributes of the transaction. The Stories Model compares this story with the most plausible story for a person engaging in a fraudulent transaction and assesses their relative probability. The Stories Model evaluates possible stories and calculates, for each story, the probability that the transaction Attributes would have their current values given that story. The probabilities then are summed to obtain the probability of the Attributes for a legitimate transaction. The same is then done for a fraudulent transaction, and the relative probability of the two is determined and provided as output. That is:

$$\frac{P(\text{fraud} \mid \text{attributes})}{P(\text{legit} \mid \text{attributes})} = \frac{P(\text{fraud})}{P(\text{legit})} \cdot \frac{P(\text{attributes} \mid \text{fraud})}{P(\text{attributes} \mid \text{legit})}$$

To calculate P(attributes|fraud) we enumerate all values of the adjectives and their probabilities, and given those we calculate the probability of the observables as independent:

$$P(\vec{x} \mid \text{legit}) = \sum_{story: \vec{q} \in Q} P(\vec{x} \mid \vec{q}, \text{legit}) \cdot P(\vec{q} \mid \text{legit}) = \ldots$$

which ideally complete the decoupling of the observable attributes, and in this case:

$$\ldots = \sum_{story: \vec{q} \in Q} P(\vec{q} \mid \text{legit}) \prod_{i=1}^{n} P(x_i \mid \vec{q}, \text{legit})$$

The Model can be trained by various data and analyst assessments of various probabilities and connections between variables.

2.8 Probabilistically Tagged Data Points

In ordinary classification scenarios in machine learning and data science, the training set is composed of many "tagged" data points; i.e., data points for which the correct class is known. Using the fraud determination example, this can refer to credit transactions whose fraud status is known—they are known either to be fraudulent or legitimate.

The following is one implementation of a method used when certain absolute tagging is not available; rather, probabilistic tagging is used. For example, a given transaction may be tagged as fraudulent with a probability of 0.9 whereas, for another transaction, the probability of fraud is 0.003. This information can be used to perform the basic actions and calculations required in a classification scenario: classifier training, assessing performance and information gain, generating statistics, and future inference.

Data points (transactions) can be tagged in several ways, some manual and some automatic. The tagging represents a current best estimate of the probability that a given transaction is fraudulent (or that an entity is engaging in fraudulent activity). One way to tag data points is manually, e.g., analysts view transactions and state the probability that a given transaction is fraudulent. This can be done on an absolute scale of probability (from 0.001 to 0.99). Analysts can be calibrated to provide an accurate probability using a calibration method for learning to assess uncertainty in probabilistic terms, such as the "credence calibration game."

Data points can also be tagged automatically, e.g., by calibrating the score of the automatic classifier to obtain its level of certainty for each scoring range, and using that as the probability of fraud for a transaction. Other sources of information can also be used, such as additional transactions by the same purchaser, a credit card chargeback notice on a given transaction, and a period of time passed since the transaction was performed without notification of a chargeback from the merchant. The result of this tagging feeds into the probability that a given transaction is fraud, referred to below as "is_fraud."

Probabilistically tagged data points can be used in a variety of manners, as described in the following subsections.

2.8.1 Fractional Ball Counts

In classification scenarios the number of data points of each class is generally counted. For instance, to estimate the a-priori probability of each class, the number of tagged data points belonging to each class would be counted. The prior probability of class A would be $$\frac{|A|}{|\text{data points}|}$$

In the present use of counts, rather than use the conventional "balls in cells," the adapted "fractional balls in cells" is used instead. For instance, the prior probability of the class Fraud would be:

$$P(\text{Fraud}) = \frac{\sum_{\text{transaction } i} P(i \text{ is Fraud})}{|\text{transactions}|}$$

The above "soft tagging" is used for the machine learning that sets the configuration coefficients of the Model in a straightforward manner, as the probability P of both a transaction being fraud and any other proposition C can be readily expressed from its frequency:

$$P(\text{Fraud AND } C) = \frac{\sum_{\text{transaction}}^{i} P(Tx_i \text{ is Fraud AND } C_i)}{|\text{transactions}|}$$

2.8.2 Information Gain

The property of information gain can be calculated as I(Fraud; X)=H(Fraud)−H(Fraud|X), which includes functions of the probabilities calculated above. Correlation between Attributes can similarly be calculated by I(X; Y|Fraud), as this is a function of the probabilities calculated above.

2.8.3 Training Probabilistic Models for Classifiers

The above generalization of tagging can be used by the system when applying a decision and performing classification. Probabilities can also be used to train Bayesian classifiers that are based on such probabilities.

2.8.4 Assessing Classifier Performance

To estimate the relevant metrics for the performance of a classifier, straightforward generalizations of the ordinary formulas can be used. For instance, given a threshold score for classification, the confusion matrix can be generalized as: P(classified as A|it is B), where A, B are the classes Fraud and Legit. Area Under Curve and the like can be calculated using these numbers.

2.8.5 Future Inference

The probability of a given transaction being fraudulent can be used as an Attribute to classify a future transaction by the same user. For example, if this user performed a transaction that is very likely to be fraudulent, it is also very likely that the current transaction is fraudulent.

3. Prime Decision Components

Figure 8:
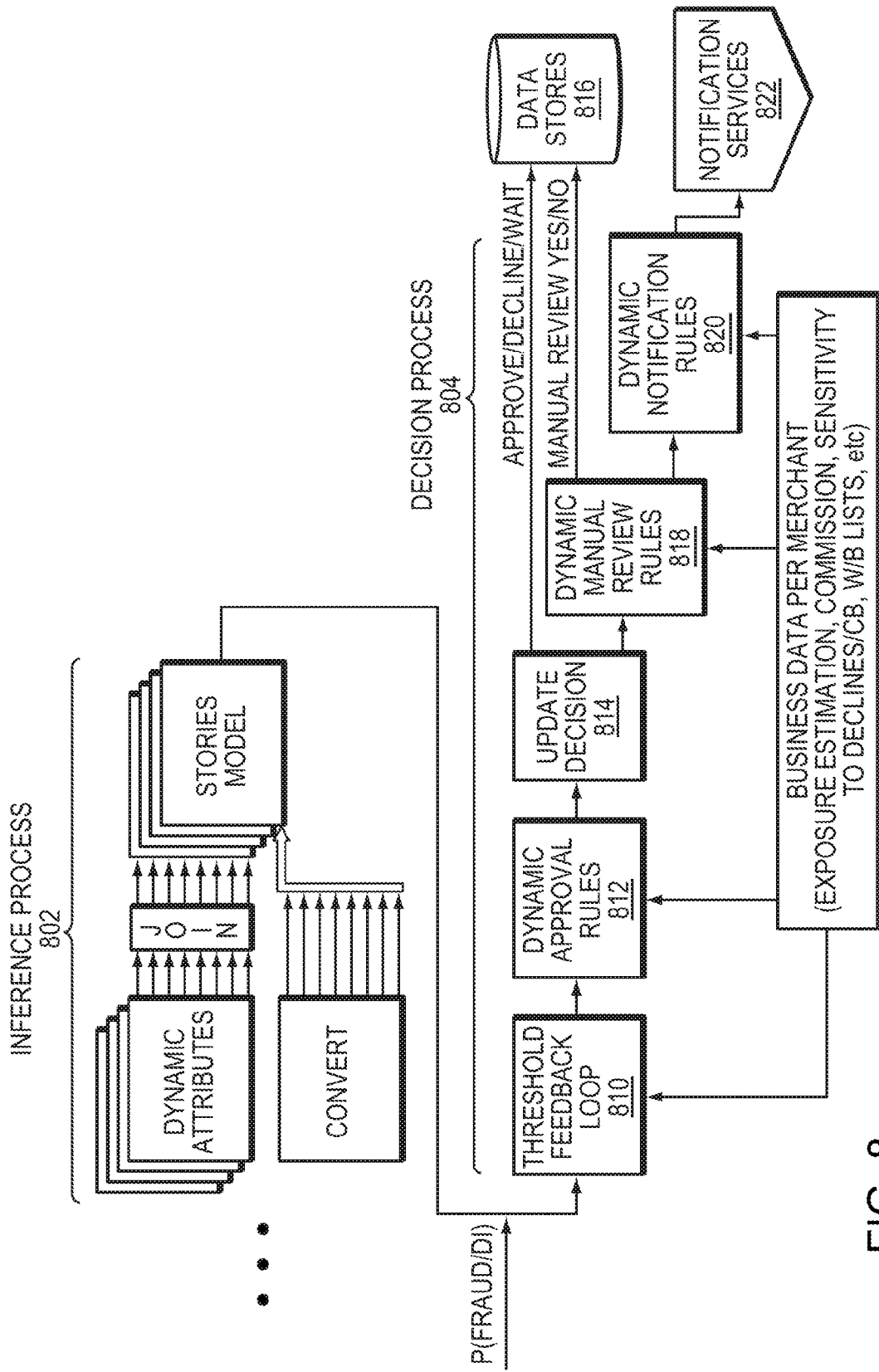
FIG. 8 depicts a high-level overview of prime decision components.

Referring now to FIG. 8, the Inference Process 802 (as described above) outputs the probability of fraud given the available data and background information (P(Fraud/DI)) into the Decision Process 804. Components in the Decision Process 804 include Approval Decision components (solid) and Asynchronous Additional Decision components (shaded). The Approval Decision components include a utility-based Threshold Feedback Loop 810, which optimizes an approval threshold in an attempt to maximize a utility function given a set of business constraints, and tests the probability of the transaction to be fraud against the threshold, and Dynamic Approval Rules 812, which can override threshold-based decisions, e.g., using a pre-approved list of people who are permitted to perform a transaction. Based on the foregoing, the decision is updated 814 as appropriate, and sent to Data Stores 816 (volatile and persistent), from which a Gate returns the decision to a requesting system.

Business constraints considered by the Threshold Feedback Loop 810 include, for example, the sensitivities of the merchant to decline rate, to overall chargeback rate, and to temporary exposures to chargeback. In some implementations, the threshold, the rate by which the threshold may deviate from a manual setting, and the limits to automatic movement of the threshold can be manually dictated. Data used to optimize the threshold can include data relevant to the target function being maximized, such as commission rate. One of several target functions may be chosen, according to business needs, which can change from time to time. Examples include maximizing profit (which can be approximated as minimizing chargeback rate under decline rate constraint) and maximizing value to customer (which can be approximated as minimizing declines under chargeback rate constraint, for cases in which full guarantee against fraud is given to the merchant (a full coverage case)).

In the Threshold Feedback Loop 810, for each transaction, according to a configuration setting, the decline rate is updated, taking into account the decision, and the chargeback rate is updated, taking into account the probability of fraud of the transaction, in the event it was approved. The Threshold Feedback Loop 810 then sets the next value of the threshold, which steps in the direction of maximizing the business target under the business constraints. For example, for a case in which the business target is to maximize value for the merchant, where the achieved chargeback rate is very low (0.1% in this example, where 0.5% would otherwise be acceptable), and the decline rate is 5%, the feedback loop will move to lower the fraud probability threshold (above which a transaction would be declined) to lower the decline rate, thus increasing actual sales for the merchant, and trading-off higher chargeback rate under the constraint of not reaching a chargeback rate higher than 0.5%. The Threshold Feedback Loop 810 can use either linear (such as proportional-integral-derivative feedback) techniques or non-linear feedback techniques.

The Asynchronous Additional Decisions components include Dynamic Manual Review Rules 818, which dictate whether the transaction will be sent for manual review for gap analysis, and Dynamic Notification Rules 820, which dictate whether an operator or the merchant will be notified about the transaction (e.g., via Notification Services 822).

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method for reducing latency and complexity of computing operations in online fraud identification systems, the method performed on at least one server comprising at least one processor, at least one data store, and at least one local memory, the method comprising:
    receiving first information relating to online browsing activity of a user;
    receiving second information relating to an online transaction being performed by the user;
    attempting to identify one or more matching known entities likely to be related to the user by:
        identifying (i) a first set of characteristics associated with the transaction that are relevant to directly linking the user to at least one known entity and (ii) a second set of characteristics associated with the transaction that are relevant to determining a probability of a link between the user and at least one known entity;
        retrieving, based on the first set of characteristics, from the data store a set of potentially matching entity objects, each entity object defining a known entity and comprising a plurality of attributes associated with the known entity;
        storing the set of potentially matching entity objects on the local memory to reduce latency in performing one or more evaluation stages of whether the user can be linked to a known entity;
        determining in a first evaluation stage having a first computational complexity, based on the first set of characteristics, whether the user can be directly linked to a first set of one or more known entities defined by the entity objects stored on the local memory and, if the user can be directly linked, designating the first set of known entities as the matching known entities to reduce concurrency of transactions reaching further of the evaluation stages having greater computational complexity; and
        if the user cannot be directly linked: determining in a second evaluation stage having a second computational complexity greater than the first computational complexity, based on the second set of characteristics, whether the user can be indirectly linked to a second set of one or more known entities having a probable link to the user and, if the user can be indirectly linked, designating the second set of known entities as the matching known entities;
    determining third information comprising one or more characteristics that are likely to be characteristics of the user, the determination of the third information being based on: (i) characteristics of the one or more matching known entities or (ii) a failure to identify one or more matching known entities likely to be related to the user;
    deriving a plurality of model attributes from at least one of the first information, the second information, and the third information;
    providing the model attributes as input to a fraud determination model; and
    determining, using the fraud determination model and one or more of the model attributes, a probability that the transaction is fraudulent.

2. The method of claim 1, wherein the online browsing activity comprises at least one of browsing activity on a first website where the transaction is being performed and possible browsing activity on one or more websites other than the first website.

3. The method of claim 2, wherein the first information relating to the online browsing activity comprises at least one of a path of webpages traversed by the user on the first website, particular content viewed by the user on the first website, and recognized content viewed by the user on one or more websites other than the first website.

4. The method of claim 1, wherein the first information relating to the online browsing activity comprises at least one of a measure of time spent by the user viewing a first website where the transaction is being performed, a measure of time spent by the user viewing one or more websites other than the first website while connected to the first website, an identification of breaks in the browsing activity on the first website, a measure of time spent by the user on particular webpages having recognized content, and an order of webpages visited by the user on the first website.

5. The method of claim 1, wherein the second information relating to the online transaction comprises at least one of a buyer contact information, buyer billing information, buyer shipping information, payment information, a purchase time, items in an online shopping cart, and a relationship between a first location and a second location, the locations being selected from the group consisting of a billing address, a shipping address, and a browsing location.

6. The method of claim 5, wherein the relationship between the first location and the second location comprises a measure in strength of a link between the first location and the second location based on at least one of a geographical distance between the first and second locations, a socio-economic similarity or disparity between the first and second locations, a cultural similarity or disparity between the first and second locations, and a commercial relationship between the first and second locations.

7. The method of claim 1, wherein determining the third information comprises:
    inferring one or more characteristics of the user based on the transaction and (i) at least one of characteristics of the one or more matching known entities and online activities performed by the one or more matching known entities or (ii) a failure to identify or more matching known entities likely to be related to the user.

8. The method of claim 7, wherein the inferred characteristics of the user comprise at least one of a socio-economic status, a culture, an ethnicity, a location or IP pattern, a buying pattern, a consumer preference, and a characteristic of social media activity.

9. The method of claim 1, wherein determining the second set of one or more known entities having a probable link to the user comprises:
 defining a set of user profile matches based on one or more characteristics of the transaction and one or more characteristics associated with a plurality of known persons; and
 identifying one or more potential known entity matches by calculating a relative probability based on a first probability that the user is the same as a particular known person given the set of user profile matches and a second probability that the user is not the same as a particular known person given the set of user profile matches.

10. The method of claim 1, wherein the determining that the second set of one or more known entities has a probable link to the user is based at least in part on one or more of the first information and the second information.

11. The method of claim 1, wherein the determining that the second set of one or more known entities has a probable link to the user is based at least in part on one or more of:
 a detected change of an Internet Protocol address of the user;
 a detected change in a device of the user;
 a detected change in an email address of the user;
 a determination that an Internet Protocol address of the user is masked; and
 identifiers of at least one of a device associated with the transaction and a device associated with a matching known entity, the identifiers determined based on one or more of hardware and software characteristics of the respective device.

12. The method of claim 1, wherein deriving the model attributes comprises at least one of:
 creating an attribute indicating that the one or more matching known entities have one or more transactions that were previously approved;
 creating an attribute indicating that the one or more matching known entities have one or more transactions that were manually tagged as legitimate;
 creating an attribute indicating that the one or more matching known entities have one or more transactions that have a particular probability of being legitimate given respective ages of the transactions and an absence of contrary evidence;
 creating an attribute indicating that the one or more matching known entities have one or more transactions that were previously declined;
 creating an attribute indicating that the one or more matching known entities have one or more transactions that were manually tagged as fraudulent or legitimate with a particular probability; and
 creating an attribute indicating that the one or more matching known entities have one or more transactions that were previously found to be fraudulent.

13. The method of claim 1, further comprising providing as input to the fraud determination model data associated with historical transactions, wherein one or more of the historical transactions are each tagged with a probability that the historical transaction was fraudulent or legitimate.

14. The method of claim 13, wherein the determining the probability that the transaction is fraudulent is based at least in part on the probability that one or more of the historical transactions was fraudulent or legitimate.

15. A system configured to reduce latency and complexity of computing operations in online fraud identification, the system comprising:
 a data store and a local memory;
 a memory for storing computer-executable instructions; and
 a processing unit for executing the instructions stored on the memory, wherein execution of the instructions programs the processing unit to perform operations comprising:
  receiving first information relating to online browsing activity of a user;
  receiving second information relating to an online transaction being performed by the user;
  attempting to identify one or more matching known entities likely to be related to the user by:
   identifying (i) a first set of characteristics associated with the transaction that are relevant to directly linking the user to at least one known entity and (ii) a second set of characteristics associated with the transaction that are relevant to determining a probability of a link between the user and at least one known entity;
   retrieving, based on the first set of characteristics, from the data store a set of potentially matching entity objects, each entity object defining a known entity and comprising a plurality of attributes associated with the known entity;
   storing the set of potentially matching entity objects on the local memory to reduce latency in performing one or more evaluation stages of whether the user can be linked to a known entity;
   determining in a first evaluation stage having a first computational complexity, based on the first set of characteristics, whether the user can be directly linked to a first set of one or more known entities defined by the entity objects stored on the local memory and, if the user can be directly linked, designating the first set of known entities as the matching known entities to reduce concurrency of transactions reaching further of the evaluation stages having greater computational complexity; and
   if the user cannot be directly linked: determining in a second evaluation stage having a second computational complexity greater than the first computational complexity, based on the second set of characteristics, whether the user can be indirectly linked to a second set of one or more known entities having a probable link to the user and, if the user can be indirectly linked, designating the second set of known entities as the matching known entities;
  determining third information comprising one or more characteristics that are likely to be characteristics of the user, the determination of the third information being based on: (i) characteristics of the one or more matching known entities or (ii) a failure to identify one or more matching known entities likely to be related to the user;
  deriving a plurality of model attributes from at least one of the first information, the second information, and the third information;
  providing the model attributes as input to a fraud determination model; and determining, using the fraud determination model and one or more of the model attributes, a probability that the transaction is fraudulent.

16. The system of claim 15, wherein deriving the model attributes comprises at least one of:
creating an attribute indicating that the one or more matching known entities have one or more transactions for which a chargeback was claimed;
creating an attribute indicating that the one or more matching known entities have one or more transactions for which an external indication of probable fraud exists;
creating an attribute indicating that the one or more matching known entities have one or more transactions for which a reduced probability of fraud can be estimated based on a lack of indication of fraud given the current age of that transaction.

17. The system of claim 16, wherein the reduced probability of fraud is estimated based on historical records at least one of indicating a delayed arrival of a fraud indication and quantifying a delay in arrival of a fraud indication.

18. The system of claim 15, wherein deriving the model attributes comprises at least one of:
creating an attribute indicating a number of different email addresses used by the one or more matching known entities within a particular time period or periods;
creating an attribute indicating a number of different payment methods or different credit cards used by the one or more matching known entities within a particular time period or periods;
creating an attribute indicating a number of transactions by the one or more matching known entities within a particular time period for which an address verification system returned a particular result;
creating an attribute indicating a number of transactions by the one or more matching known entities within a particular time period or periods for which contact or shipping information for the one or more matching known entities was different; and
creating an attribute indicating a number of transactions by the one or more matching known entities within a particular time period for which a value of the transaction by the one or more matching known entities is unexpected compared to a distribution of historical transaction values by the one or more matching known entities.

19. The system of claim 15, wherein providing the model attributes as input to the fraud determination model comprises applying a coefficient to a particular model attribute, the coefficient being automatically calculated on a periodic basis and based on historical data indicating an effect of the particular model attribute on a probability that a particular transaction is fraudulent.

20. The system of claim 15, wherein providing the model attributes as input to a fraud determination model comprises applying a coefficient to a value of a particular model attribute, the coefficient being based on (i) a determination of a domain expert of an effect of the particular model attribute on a probability that, given values of other model attributes, a particular transaction is fraudulent or (ii) a machine-learned coefficient.

21. The system of claim 15, wherein each model attribute has an attribute value, and wherein determining a probability that the transaction is fraudulent comprises:

(a) calculating, for each of a plurality of different transaction user profiles, a probability of an collective occurrence of the values of the model attributes given the transaction user profile;
(b) calculating, for each of a plurality of different transaction user profiles, a probability that the user corresponds with the transaction user profile; and
(c) determining a probability that a particular transaction would be legitimate based on a normalization and combination of the probabilities from (a) and (b).

22. The system of claim 21, wherein the transaction user profiles comprise fraudulent user profiles and legitimate user profiles.

23. The system of claim 15, wherein the operations further comprise approving, denying, or pending the transaction based at least in part on the likelihood that the transaction is fraudulent.

24. The system of claim 23, wherein approving, denying, or pending the transaction comprises:
determining a decision threshold based on a plurality of business considerations and statistics associated with historical transactions; and
approving the transaction if the likelihood that the transaction is fraudulent exceeds the decision threshold.

25. The system of claim 24, wherein the business considerations comprise at least one of a sensitivity of a merchant to a decline rate, a sensitivity of a merchant to a chargeback rate, and a sensitivity of a service vendor or a merchant to a temporary exposure to a chargeback given a particular payment method.

26. The system of claim 25, wherein a decision to approve, deny, or pend the transaction is modified by additional business considerations comprising at least one of an inclusion or exclusion list, a fraudster community expected reaction to decline or approval patterns, an exposure based on a number of entities having a high accumulated fraud probability, and an exposure based on a monetary sum of entities having a high accumulated fraud probability.

27. The system of claim 15, wherein the operations further comprise:
identifying an anomaly in at least one of a measured parameter and a combination of measured parameters being tracked over a particular period or periods of time; and
increasing a probability that the transaction is fraudulent based on a determination that one or more characteristics associated with the transaction are consistent with the anomaly.

28. The system of claim 15, wherein the operations further comprise:
identifying an anomaly in at least one of a measured parameter and a combination of measured parameters associated with a first person and being tracked over a particular period or periods of time;
identifying the anomaly in at least one of a measured parameter and a combination of measured parameters associated with a second person and being tracked over a particular period or periods of time; and
increasing a probability that the two or more persons having characteristics consistent with the anomaly are the same person.

* * * * *